United States Patent
Ray et al.

(10) Patent No.: US 8,370,270 B2
(45) Date of Patent: Feb. 5, 2013

(54) SYSTEM AND METHOD FOR CREATING AN EFFICIENT SHIPPING STRATEGY FOR SHIPPING PRINTED MATERIAL

(75) Inventors: Elton T. Ray, Lakeville, NY (US); Jonathan A. Goldstein, Rush, NY (US)

(73) Assignee: Xerox Corporation, Norwalk, CT (US)

( * ) Notice: Subject to any disclaimer, the term of this patent is extended or adjusted under 35 U.S.C. 154(b) by 1146 days.

(21) Appl. No.: 12/029,156

(22) Filed: Feb. 11, 2008

(65) Prior Publication Data

US 2009/0201533 A1    Aug. 13, 2009

(51) Int. Cl.
G06Q 30/00    (2012.01)
G06Q 10/00    (2012.01)

(52) U.S. Cl. ..................... 705/330; 705/7.12

(58) Field of Classification Search .............. None
See application file for complete search history.

(56) References Cited

U.S. PATENT DOCUMENTS

| | | | |
|---|---|---|---|
| 5,316,279 A | 5/1994 | Corona et al. | |
| 5,628,249 A | 5/1997 | Cordery et al. | |
| 5,684,706 A | 11/1997 | Harman et al. | |
| 5,729,674 A | 3/1998 | Rosewarne et al. | |
| 7,145,670 B2* | 12/2006 | Keane et al. | 358/1.13 |
| 7,596,333 B2* | 9/2009 | Kasiske et al. | 399/67 |
| 7,634,414 B2* | 12/2009 | Arneson et al. | 705/1.1 |
| 7,855,799 B2* | 12/2010 | Shah | 358/1.15 |
| 2002/0097407 A1* | 7/2002 | Ryan et al. | 358/1.1 |
| 2002/0186402 A1* | 12/2002 | Jackson et al. | 358/1.15 |
| 2003/0035138 A1* | 2/2003 | Schilling | 358/1.15 |
| 2003/0084006 A1* | 5/2003 | Hobbs | 705/400 |
| 2003/0200111 A1* | 10/2003 | Damji | 705/1 |
| 2005/0234818 A1 | 10/2005 | Marshall | |
| 2006/0218881 A1 | 10/2006 | Sperry et al. | |
| 2007/0171437 A1* | 7/2007 | Kasiske et al. | 358/1.6 |
| 2007/0247656 A1 | 10/2007 | Manchala | |
| 2009/0187433 A1* | 7/2009 | Nudd | 705/4 |
| 2009/0201533 A1* | 8/2009 | Ray et al. | 358/1.15 |
| 2009/0287585 A1* | 11/2009 | Elarde et al. | 705/26 |
| 2011/0063677 A1* | 3/2011 | Shah | 358/1.15 |
| 2011/0286016 A1* | 11/2011 | Lavigne et al. | 358/1.9 |

OTHER PUBLICATIONS

Xerox, "Digital press satisfies the need for speed", Jan. 1, 2008, American Printer V 125 N 1.*

* cited by examiner

*Primary Examiner* — George Chen
(74) *Attorney, Agent, or Firm* — MH2 Technology Law Group LLP

(57) ABSTRACT

A system and related method for creating an efficient shipping strategy for shipping printed material is disclosed. The system includes a communication component, an analysis component and a shipping component. The communication component communicates printing instructions. The printing instructions include image data and at least one job parameter. The analysis component communicates with the communication component and determines at least one physical property of a print job when formed according to the printing instructions. The shipping component generates shipping information in accordance with the at least one physical property.

22 Claims, 3 Drawing Sheets

SYSTEM AND METHOD FOR CREATING AN EFFICIENT SHIPPING STRATEGY FOR SHIPPING PRINTED MATERIAL

BACKGROUND

1. Technical Field

The present disclosure relates to shipping printed material, and in particular, to a system and method for creating an efficient shipping strategy for shipping the printed material.

2. Description of Related Art

Production printing systems generally have a modular design in which various parts of the printing system perform differing tasks. One part may feed printing media, e.g., paper, into a print path. As the media travels along the print path, the printing system utilizes the paper. One such part, or printing module, is the print engine module. The print engine module marks each piece of the media appropriately based off of either static or dynamic image data. For example, a printing system may be tasked to print 500 copies of a book that includes a particular page with a picture and a custom message below the picture. The picture may be of a character of the book and the message may be directed to an anticipated purchaser of the book. For example, if Tom Smith bought a book, the message may state, "This is Tom Smith's book". The picture can be referred to as static print data while the message can be referred to as variable print data.

A printing system tasked to print variable print data is engaged in variable data printing. Other types of variable data printing may include printing serial print jobs in which the stock or media changes between successive print jobs. In addition, another type of variable data printing is printing different mailing or packaging labels for placing on (or in) a shipping container prior to transferring that portion of the print job to a shipping carrier.

Multiple customers of the owner(s) of the printing system may submit these successive print jobs. Generally, these customers are located remotely to the facilities of the printing system and can design and submit a print job therefrom. For example, it is common for the customer to have custom software that can submit image data, such as image data contained in a page description language file, along with a job ticket (this submission process is sometimes referred to as ticketing). The job ticket can include relevant information, such as the stock type desired and other information associated with the image data, the customer or the like.

Generally, near the printing station a key-op collects the print jobs and prepares them for shipping. The key-op usually prepares the shipping label by manually entering in shipping information and guesses as to which shipping container(s) to use. The key-op then gives the packaged portion of the printed print job to the shipping carrier to arrive at the customer's preferred destination. Because of the variability of the printed print job within the print jobs and/or between successive print jobs, it is difficult for the key-op to select optimal shipping parameters, e.g., which carrier to use and which shipping container to select.

Additionally, the key-op may introduce additional inefficiencies when preparing the print job for shipping. For example, the key-op generally has to weigh each portion of the printed print job and determine which box has sufficient tear strength, dimensions and carrying capacity before selecting the shipping container. The key-op has to wrap each portion, place that portion into a shipping container (e.g., a box) and then use adhesive tap to complete the packaging. After the label(s) are printed and affixed, the packaged portion of the print job may need additional weighing because additional weight is added by the wrapping, the packaging, the shipping container, the labeling and the adhesive tape. The postage needs to conform to the actual shipping weight or the postage paid may be too high or too low.

SUMMARY

The present disclosure relates to shipping printed material. More particularly the present disclosure relates to a system and method for creating an efficient shipping strategy for shipping the printed material.

The system includes a communication component, an analysis component and a shipping component. The communication component communicates printing instructions. The printing instructions include image data and at least one job parameter, and the at least one job parameter may be included in a job ticket. The analysis component communicates with the communication component. The analysis component determines at least one physical property of a print job when formed according to the printing instructions. The shipping component generates shipping information in accordance with the at least physical property.

For example, the at least on physical property can include a weight of a portion of the print job and the printing instructions includes finishing parameters; the analysis component determines the weight of the portion of the print job while accounting for, as indicated by the finishing parameters, a weight of a staple, a weight of a length of binding tape and/or a reduction in weight of a stock from at least one hole punched.

The analysis component determines one or more physical properties of the print job. The physical properties may include a stock weight of a portion of the print job, a total toner weight of the portion of the print job, a total number of sheets of the portion of the print job, an another total number of sheets of the print job, a stock size, a stock type, a stock thickness, a stock dimension, a stock material composition, a stock percent cotton and/or a stock percent linen. The at least one job parameter of the printing instructions may include at least one stock parameter. The at least one stock parameter of the printing instructions may include a stock size, a stock type, a stock thickness, a stock dimensions, a stock material composition, a stock percent cotton and/or a stock percent linen.

The system includes a data storage component (e.g., a database) that can communicate with the analysis component and/or the shipping component. The data storage component can communication a shipping address, a shipping capability and/or a postage value to the shipping component to cooperate with the shipping component to generate the shipping information. Additionally or alternatively, the at least one job parameter of the printing instructions includes an order ID and the data storage component associates the order ID with a customer parameter and communicates the customer parameter to the shipping component and/or the analysis component. The customer parameter may be an address, a credit balance, a customer printing preference, a customer shipping preference, variable printing data and/or a customer shipping container preference.

The at least one job parameter of the printing instructions includes an address, a customer printing preference, a customer shipping preference, a customer shipping container preference, a finishing parameter and/or a binding parameter. The shipping component uses the at least one job parameter for generating the shipping information and/or the analysis component uses the at least one job parameter for generating the at least one physical property.

The shipping information may include labeling information. For example, the shipping information generated by the shipping component may include an address, shipping container information, a shipping carrier service type, a shipping carrier, a postage, an invoice number, an account ID, a customer ID, a bar code and/or a weight of a portion of the print job when packaged, all of which may be included in the labeling information as well. The shipping information may be printed on a printed label for appending to a portion of the print job.

The shipping component determines a shipping container for packaging a portion of the print job. The shipping information includes shipping container information associated with the shipping container. The shipping container information may include a total shipping weight of the packaged portion of the print job. The total shipping weight can include a weight of the shipping container, a weight of adhesive tape necessary to package the portion of the print job and a weight of the portion of the print job. The weight of the portion of the print job may include the weight of toner disposed on the portion of the print job. Additionally or alternatively, the shipping container information may also include the weight of toner disposed on the portion of the print job.

The shipping container information can include a total postage value for shipping the portion of the print job. The shipping component can generate the total postage value based off of a shipping weight of the packaged portion of the print job, the shipping container, a shipping carrier, a shipping carrier service type and/or the at least one job parameter. Additionally or alternatively, the shipping component can determine the shipping container based on one or more of a shipping container tear strength, a shipping container dimension, a shipping container inventory availability, an adhesive tape weight and/or an adhesive tape cost.

The shipping component determines the shipping container to minimize at least one of a shipping cost, a key-op workload, a key-op cost and an inventory utilization. The shipping component can further determine the shipping container such that a shipping constraint, if necessary, is satisfied, e.g., such that a time constraint or a priority constraint is satisfied.

The shipping component determines a plurality of shipping containers for packaging a plurality of portions of the print job. The plurality of shipping containers is determined such that a total shipping cost of the print job is minimized and that a shipping constraint, if necessary, is satisfied. The shipping component can determine the plurality of shipping containers as a function of a plurality of shipping costs associated with each respective shipping container. Each respective shipping cost is associated with a shipping carrier, a shipping carrier service type, the dimension of the shipping container and a total shipping weight. Each respective shipping container may have more than one shipping cost associated with it.

The method for creating an efficient shipping strategy for shipping printed material includes the steps of communicating printing instructions, determining at least one physical property of a print job when formed according to the printing instructions and generating shipping information in accordance with the at least one physical property. The printing instructions include image data and at least one job parameter.

The step of determining the at least one physical property of the print job when formed according to the printing instructions can include the step of determining a total shipping weight. The total shipping weight can include a stock weight of a portion of the print job and a total toner weight of the portion of the print job. The step of determining the at least one physical property of the print job when formed according to the printing instructions may include the step of determining a stock dimension of a portion of the print job.

The step of generating the shipping information in accordance with the at least one physical property includes the step of determining a shipping container for packaging a portion of the print job. The shipping information can include shipping container information associated with the shipping container.

The step of generating the shipping information in accordance with the at least one physical property may include the step of determining a plurality of shipping containers for packaging a plurality of portions of the print job. The plurality of shipping containers can be determined such that a total shipping cost of the print job is minimized and that a shipping constraint, if necessary, is satisfied.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
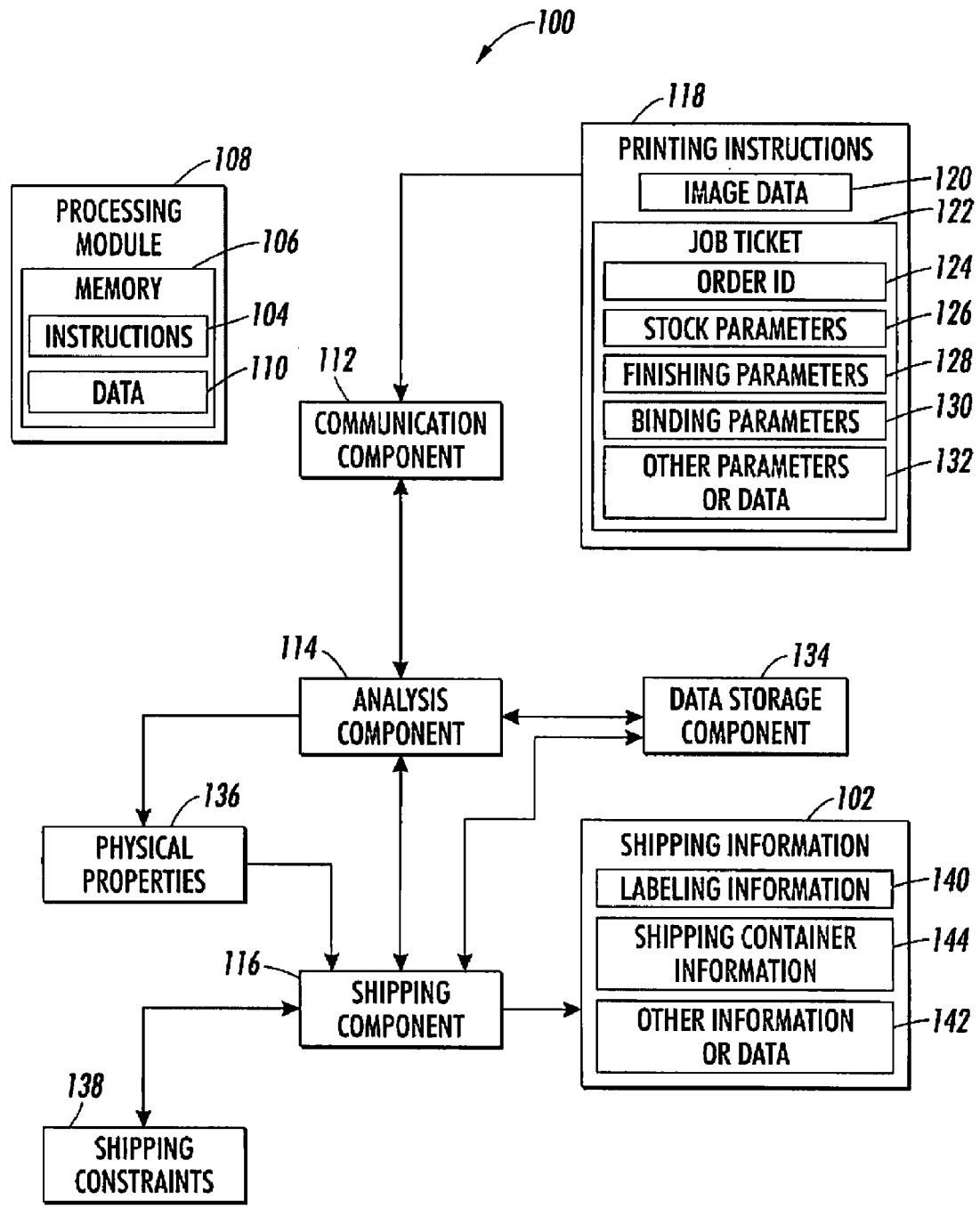
FIG. 1 is a block diagram of a system that can be used for creating an efficient shipping strategy for shipping printed material in accordance with the present disclosure.

Referring to the drawings, FIG. 1 is a block diagram of a system 100 that creates an efficient shipping strategy for shipping printed material. The type of printed material that can be shipped using system 100 includes paper, books, pamphlets, photographs, the like or any other type of material that may be used to complete a print job (e.g., letter envelopes). System 100 can determine multiple types of information for shipping the printed material such as the shipping container(s) needed, the shipping weight of the total printed material (i.e., the print job when printed) or the weight of a portion thereof, the postage needed, the shipping carrier and a shipping carrier service type. This shipping information may be used to achieve one or more goals while satisfying one or more shipping constraints, such as a time constraint or a priority constraint.

For example, the goal may be to minimize total shipping costs of 500 printed pamphlets that are not time critical (i.e., no time constraints on shipping). System 100 can then generate shipping information 102 that includes shipping container information 144 that minimizes the total shipping cost by selecting a plurality of shipping containers (e.g., five 1×1×1 foot boxes), a shipping carrier for all of the shipping containers (e.g., a governmental shipping entity) and a shipping carrier service type (e.g., ground service).

Additionally, system 100 may determine a plurality of boxes for shipping the print job to achieve a goal by calculating the optimal shipping strategy. For example, it may be cheaper to ship 500 smaller shipping containers than to ship 400 larger shipping containers despite that the same print job is shipped.

Figure 2:
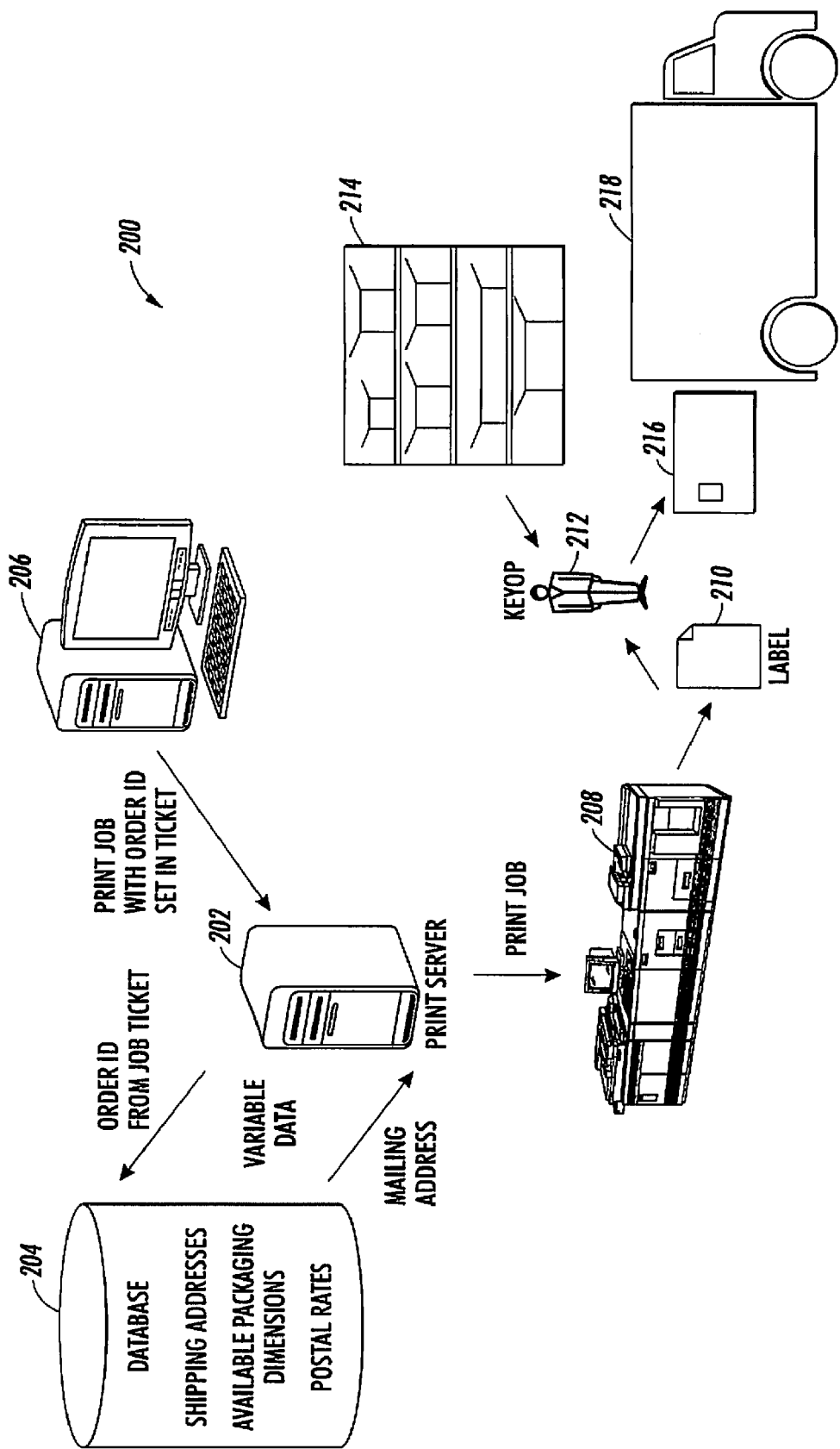
FIG. 2 is an illustration of another embodiment of a system that can be used for creating an efficient shipping strategy for shipping printed material in accordance with the present disclosure.

System 100 is implemented by operative set of processor executable instructions 104 found in memory 106 of processing module 108. Additionally, memory 106 may include data 110. One or more processors found in processing module 108 (not explicitly shown) may execute instructions 104. Additionally or alternatively, system 100 may be implemented in hardware, software, software in execution, firmware, circuitry or the like. For example, system 100 may be implemented, at least partially, on a print server as shown in FIG. 2 and discussed in more detail below.

System 100 includes communication component 112, analysis component 114 and shipping component 116. Communication component 112 can receive printing instructions 118. Printing instructions 118 are the instructions sent to a printing system and/or a printing device, such as a production printing system and contain instructions for printing. Printing instructions 118 include image data 120 and job ticket 122. Image data 120 may include data that may be printed, such as data found in a page description language file. Job ticket 122 can include order ID 124, stock parameters 126, finishing parameters 128, binding parameters 130 and other parameters or data 132.

Order ID 124 may be a customer number, an account number, a serial number, a print job receipt number or the like. Order ID 124 may be used by a print server to retrieve other information from a data storage component, such as data storage component 134. Stock parameters 126 can include information related to the stock to be used in the print job. For example, stock parameters 126 may include stock size, stock type, stock thickness, stock dimensions, stock material composition, stock percent cotton, stock percent linen and the like. Stock parameters 126 may be generated by a computer where the print job is submitted, such as at a terminal of a client of a printing production company. Finishing parameters 128 may include data related to the finishing of the print job, e.g. staples, binding tape, holes punched or the like. Binding parameters 130 can relate the type of binding to be used on the print job, e.g., staples. Other parameters or data 132 may include an address, a customer printing preference, a customer shipping preference and a customer shipping container preference. For example, if printing instruction 118 were submitted over the internet from a computer that supports ticketing, the person submitting the printing instructions (e.g., via a print job) may have a preference to use a particular shipper (i.e. carrier) or prefer a certain kind of shipping container because the person may desire to recycle the shipping containers used.

Communication component 112, as mentioned above, can receive print instruction 118. Communication component 112 may be an internet connection, a network connection, a software driver, software or the like, or otherwise a device or component that can receive printing instructions 118. Communication component 112 is in operative communication with analysis component 114. Analysis component 114 can receive printing instruction 118 from communication component 112. Communication component 112 may initiate some pre-processing to prepare printing instruction 118. For example, communication component 112 may receive printing instruction 118 as data packets, may strip out the headers of the data packet and assemble the packets into a complete dataset for use by analysis component 114.

Analysis component 114 can analyze printing instructions 118 and determine physical properties 136. Physical properties 136 includes the properties of a print job printed according to printing instruction 118 despite that the print job does not necessarily have to be completed. For example, physical properties 136 may be determined during a rasterizing processes. Physical properties 136 may include a stock weight of a portion of the print job, a total toner weight of the portion of the print job, a total number of sheets of the portion of the print job, a total number of sheets of the entire print job, a stock thickness, a stock dimension, a stock material component, a stock percent cotton, a stock percent linen, a stock size and a stock type. When the term toner is used herein, it is considered to be equivalent to ink or other substrate marking material. Analysis component 114 may analyze the printing instruction 118 while rasterizing, e.g., while printing instruction 118 is being processed by a raster image processor ("RIP").

Analysis component 114 can determine physical properties 136 by analyzing and/or otherwise processing printing instructions 118. For example, analysis component 114 can determine the weight of a portion of the print job while considering the additional weight of staples, the weight of a length of binding tape, the loss of weight caused by missing material from a hole punch, and the like as indicated by finishing parameters 128.

A "portion" as referred to herein, is a unit of the print job that is to be individually shipped. For example, a print job of 1000 pages may be divided up into 10 portions each being 100 pages. Each portion of 100 pages may be placed into a shipping container (e.g., cardboard box) for shipping. A portion as used herein may be as small as one piece of stock and as large as the entire print job.

Additionally or alternatively, physical properties 134 may also be determined by analysis component 114 from information that is obtained while communicating with data storage component 134. Data storage component 134 may be a hard drive, memory, a database (e.g., a SQL server) or the like. Data storage component 134 may associate order ID 124 with customer parameters, such as an address, a credit balance, a customer printing preference, a customer shipping preference, variable printing data and customer shipping container preference. Additionally or alternatively, data storage component 134 may communicate a shipping address, a shipping capability and a postage value to analysis component 114 and/or shipping component 116. For example, the shipping capability may include data about which kind of shipping containers, shipping carriers, shipping carrier service types that are available to the public at large. Additionally or alternatively, the shipping capability may include data that is specific to the user of system 100, such as data related to the type of shipping containers available in inventory, the shipping carriers available and/or the shipping carrier service type available in the locality of system 100.

Shipping component 116 may use physical properties 136, data obtained from data storage component 136 and shipping constraints 138 to generate shipping information 102. Shipping constraints 138 may be any constraint such as time constraints or priority constraints. Shipping component 116 determines one or more shipping containers that may be used to ship the print job and uses the determinations to generate shipping container information 144. Shipping component 116 may select the shipping containers to minimize shipping costs, minimize key-op workload, minimize key-op cost and/or minimize inventory utilization.

Shipping component 116 may determine the containers based on a shipping container tear strength, a shipping container dimension, a shipping container inventory availability, an adhesive tape weight, an adhesive tape cost or the like. The shipping information 102 generated includes labeling information 140, shipping container information 144 and other information or data 142. Any of shipping information 102 may be viewed on a computer monitor or terminal and/or may be used for other processing.

Labeling information 140 may include an address, information about a shipping container, a shipping carrier service type, a shipping carrier, postage, an invoice number, an account ID, customer ID, a bar code, a weight of a portion of the print job when packaged and the like, and may be used for printing a label that is to be appended to each portion of the print job that is to be packaged by a shipping container.

Labeling information 140 may also include shipping container information 144 that includes information about the determined shipping containers. For example, shipping container information 144 may include a total shipping weight, a weight of the shipping container to be used, a weight of adhesive tape necessary to package the portion of the print job, a weight of the portion of the print job (including the toner weight) and/or the total postage value (e.g., postage of shipping a portion of the print job and/or the postage of the entire print job). Other information or data 142 may be any other related data, such as shipping priority, portion number or the like.

As mentioned previously, shipping component 116 can determine one or more shipping containers and generate shipping information 102 that contains information associated with the determined shipping container. Shipping component 116 can determine a plurality of shipping containers as a function of a plurality of shipping costs associated with each respective shipping container. Each respective shipping cost is associated with a shipping carrier, a shipping carrier service type, the dimension of the shipping container and total shipping weight. For example, for each 1×1×1 box that is available as a shipping container, shipping component 116 may have multiple costs associated with that shipping container associated with the items mentioned above. An algorithm may be used, e.g. reduction analysis, to determine the cheapest way of shipping the printed print job.

Referring to the FIGS. 1 and 2, FIG. 2 is an illustration of a system 200 that can be used for creating an efficient shipping strategy for shipping printed material. System 200 includes print server 202. Print server 202 may include communication component 112, analysis component 114 and shipping component 116 of FIG. 1. Database 204 is also shown in FIG. 2 and may be data storage component 134 of FIG. 1.

Computer 206 may include print submission software that supports ticketing. A user may submit a print job to print server 202 over the internet. The print job may be printing instruction 118 of FIG. 1. The print job may have an order ID therein that print server 202 communicates to database 204. Print server 202 may then receive a shipping address, a shipping capability (e.g., available packaging dimensions) and a postage value (e.g., postage rates available) from database 204. Print server 202 generates shipping information (e.g., shipping information 102) that is sent to production printer 208 within the print job or is separate therefrom. Because the shipping information may include labeling information, the labeling information may be printed and appended to one or more portions of the print job, e.g., print label 210. A Key-op 212 reads label 210 appended to a portion of the print job, reads the information related to which shipping container to use and selects the proper shipping container from inventory 214.

Key-op 212 then selects the proper shipping container, packages the portion of the print job and appends label 210 thereto. The label 210 may also indicate which shipping carrier, shipping carrier service types and the like such that key-op 212 may tender delivery of the packaged portion of the print job 216 to shipping carrier 218.

Figure 3:
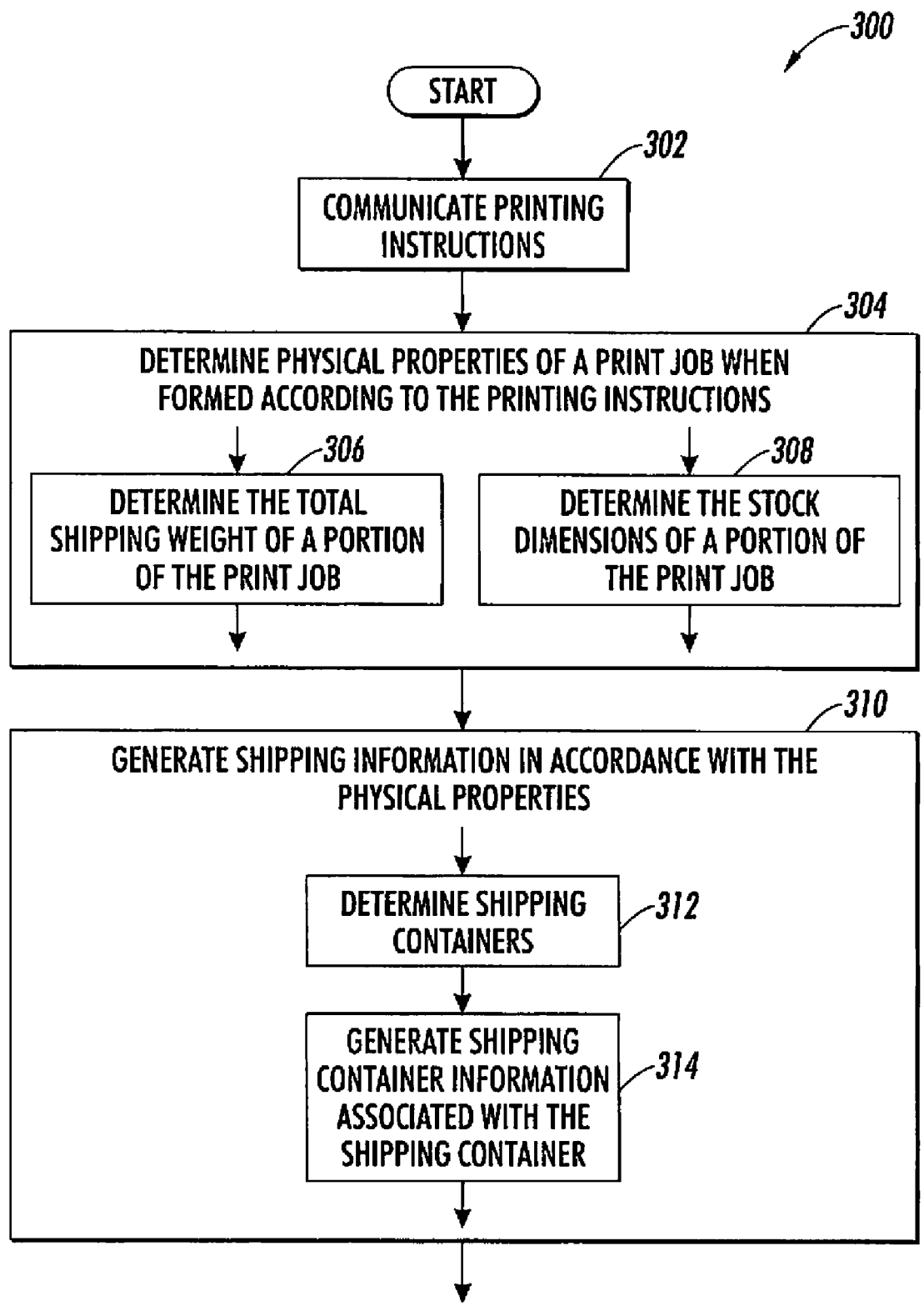
FIG. 3 is a flow chart diagram of a method for generating shipping instructions for use in creating an efficient shipping strategy for shipping printed material in accordance with the present disclosure.

Referring to the drawings, FIG. 3 shows a flow chart diagram of a method 300 for generating shipping instructions for use in creating an efficient shipping strategy for shipping printed material. Method 300 includes steps 302 through 314. Step 302 can communicate printing instructions, e.g., printing instructions 118 of FIG. 1. Step 304 can determine physical properties of a print job when formed according to the printing instructions, such as physical properties 136 of FIG. 1.

Step 304 may include steps 206 and 308. Step 306 determines the total shipping weight of a portion of the print job while step 308 determines the stock dimensions of a portion of the print job. The physical properties generated during step 304 may be utilized by step 310 that can generate shipping information in accordance with the physical properties. The shipping information may be shipping information 102 of FIG. 1. Step 310 includes steps 312 and 312. Step 312 determines shipping containers and step 314 generates shipping container information associated with the shipping container. The determined shipping containers may be determined by shipping component 116 of FIG. 1. The generated shipping container information associated with the shipping container may be shipping container information 144 of FIG. 1.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for efficiently shipping printed material, the system comprising:
   a processing system comprising: one or more processors; and
   a memory system comprising one or more computer-readable media, wherein the one or more computer-readable media contain instructions that, if executed by the processing system, cause the processing system to perform operations comprising:
   receiving printing instructions, wherein the printing instructions include image data and at least one job parameter;
   printing a print job, using one or more printers, based on the printing instructions;
   determining at least one physical property of the print job, before completion of the printing the print job, based on the printing instructions, wherein determining the at least one physical property of the print job comprises determining a loss of weight caused by missing material from a hole punch before completion of the printing the print job;
   generating shipping information in accordance with the at least one physical property; and
   determining one or more shipping container types, before completion of the printing the print job, based on at least one of the shipping information, the at least one physical property, and the at least one job parameter.

2. The system according to claim 1, wherein the at least one job parameter includes at least one customer parameter.

3. The system according to claim 2, wherein the at least one customer parameter includes at least one of an address, a credit balance, a customer printing preference, a customer shipping preference, variable printing data, a finishing parameter, a binding parameter, and a customer shipping container type preference.

4. The system according to claim 3, wherein at least one of:
the shipping information is generated based on the at least one customer parameter; and
the at least one physical property is determined based on the at least one customer parameter.

5. The system according to claim 1, wherein the shipping information includes at least one of an address, shipping container information, a shipping carrier service type, a shipping carrier, postage information, an invoice number, an account number, a customer number, a bar code and a weight of a portion of the print job when packaged.

6. The system according to claim 5, the operations further comprising:
generating at least one label based on the shipping information; and
attaching the least one label to one or more shipping containers.

7. A system according to claim 1, wherein the one or more shipping container types are determined based on a total shipping weight of a portion of the print job.

8. The system according to claim 7, wherein the total shipping weight includes at least one of a weight of the shipping container, a weight of adhesive tape necessary to package the portion of the print job, a weight of the portion of the print job, and a weight of toner disposed on the portion of the print job.

9. The system according to claim 1, wherein the determining one or more shipping container types comprises determining a plurality of shipping container types for packaging a plurality of portions of the print job.

10. The system according to claim 9, wherein the plurality of shipping container types are determined based on shipping costs associated with each respective shipping container type, wherein the shipping costs are associated with a shipping carrier, a shipping carrier service type, a dimension of the shipping container and a total shipping weight.

11. The system according to claim 1, wherein:
the printing instructions include finishing parameters, wherein the finishing parameters comprise at least one of a staple and a length of binding tape; and
the determining at least one physical property comprises determining a weight of a portion of the print job, wherein determining the weight comprises accounting for the finishing parameters.

12. The system according to claim 1, wherein the printing instructions include a job ticket, wherein the job ticket includes the at least one job parameter.

13. The system according to claim 1, wherein determining the at least one physical property of the print job further comprises determining at least one of a stock weight of a portion of the print job, a total toner weight of the portion of the print job, a total number of sheets of the portion of the print job, a total number of sheets of the print job, a stock size, a stock type, a stock thickness, a stock dimension, a stock material composition, a stock percent cotton and a stock percent linen.

14. The system according to claim 1, wherein the at least one job parameter includes at least one stock parameter, wherein the at least one stock parameter includes at least one of a stock size, a stock type, a stock thickness, stock dimension, a stock material composition, a stock percent cotton and a stock percent linen.

15. The system according to claim 1, wherein the shipping information comprises at least one of a shipping address, a shipping capability and a postage value.

16. The system according to claim 1, wherein the one or more shipping container types are determined based on a total postage value for shipping a portion of the print job.

17. The system according to claim 1, wherein the one or more shipping container types are determined based on at least one of a shipping container type tear strength, a shipping container type dimension, a shipping container type inventory availability, an adhesive tape weight and an adhesive tape cost.

18. The system according to claim 1, wherein the one or more shipping container types are determined based on a shipping constraint.

19. A method for efficiently shipping printed material, the method comprising:
receiving printing instructions, wherein the printing instructions include image data and at least one job parameter;
printing a print job, using one or more printers, based on the printing instructions;
determining, using a processor, at least one physical property of the print job, before completion of the printing the print job, based on the printing instructions, wherein determining the at least one physical property of the print job comprises determining a loss of weight caused by missing material from a hole punch before completion of the printing the print job;
generating shipping information in accordance with the at least one physical property; and
determining one or more shipping container types, before completion of the printing the print job, based on at least one of the shipping information, the at least one physical property, and the at least one job parameter.

20. The method according to claim 19, wherein the determining the at least one physical property further comprises:
determining a total shipping weight, wherein the total shipping weight includes a stock weight of a portion of the print job and a total toner weight of the portion of the print job.

21. The method according to claim 19, wherein the determining the at least one physical property further comprises determining a stock dimension of a portion of the print job.

22. The method according to claim 19, wherein the determining one or more shipping container types comprises:
determining a plurality of shipping containers types for packaging a plurality of portions of the print job.

* * * * *